United States Patent [19]
Collins et al.

[11] Patent Number: 5,476,594
[45] Date of Patent: Dec. 19, 1995

[54] VINYLAMINE POLYMERS FOR REMOVING COLOR FROM PAPER MILL EFFLUENTS

[75] Inventors: John H. Collins, Bloomingdale; Dodd; W. Fong; Anthony G. Sommese, both of Naperville; Amy M. Tseng, Woodridge, all of Ill.

[73] Assignee: Nalco Chemical Company, Naperville, Ill.

[21] Appl. No.: 239,802

[22] Filed: May 9, 1994

[51] Int. Cl.$^6$ ............................................. C02F 1/56
[52] U.S. Cl. ...................... 210/734; 210/735; 210/917; 210/928
[58] Field of Search ................................. 210/734, 735, 210/928, 917

[56] References Cited

U.S. PATENT DOCUMENTS

| | | | |
|---|---|---|---|
| 4,089,780 | 5/1978 | Svarz et al. | 210/735 |
| 4,217,214 | 8/1980 | Dubin | 210/735 |
| 4,808,683 | 2/1989 | Itagaki et al. | 526/307.2 |
| 4,957,977 | 9/1990 | Itagaki et al. | 525/328.4 |
| 5,185,083 | 2/1993 | Smigo et al. | 210/735 |
| 5,209,854 | 5/1993 | Reed et al. | 210/734 |
| 5,269,942 | 12/1993 | Harrington, IV et al. | 210/727 |
| 5,314,627 | 5/1994 | Ramesh et al. | 210/734 |
| 5,326,479 | 7/1994 | Sarkar et al. | 210/719 |

*Primary Examiner*—Neil McCarthy
*Attorney, Agent, or Firm*—James J. Drake; Robert A. Miller

[57] ABSTRACT

The invention comprises a process for removing true and apparent color from pulp and paper waste waters. It comprises treating these waste waters with a vinylamine polymer including from about 1 to about 100 mole percent vinylamine and from about 1 to about 99 mole percent of at least one monomer selected from the group consisting of amidine vinylformamide, vinyl alcohol, vinyl acetate, vinyl pyrrolidinone and the esters, amides, nitriles and salts of acrylic acid and methacrylic acid.

7 Claims, No Drawings

VINYLAMINE POLYMERS FOR REMOVING COLOR FROM PAPER MILL EFFLUENTS

FIELD OF THE INVENTION

The present invention relates to a process for removing true and apparent color from pulp and paper wastewater. In particular, the process resides in the treatment of paper mill wastewater with a vinylamine containing polymer to remove color.

BACKGROUND OF THE INVENTION

Color removal from the effluent streams of paper mills continues to be a problem within the pulp and paper industry. It is necessary that these downstream wastewaters be treated for color removal prior to discharge into public waterways.

The United States wood pulp production capacity is approximately 60 million tons per year. Since the average cellulose content of wood is about 40%, 150 million tons of wood are needed to produce this 60 million tons of pulp. The difference between these two numbers represents the lignin and hemicellulose which must be removed or separated in the pulping process in order to free the cellulose fibers.

The pulping process, however, does not remove 100% of the lignin present in the wood, with approximately 5% remaining after either kraft or sulfite pulping (for mechanical pulping the amount is considerably higher). If a high grade paper is the desired end product, this 5% residual lignin must be removed, and is accomplished by bleaching the pulp.

Since over 35% of the pulp produced in the United States is bleached, there are about one million tons of lignin removed each year at the bleach plant, and most of this in the caustic extraction stage. This number is significant because in the removal process (i.e., bleaching), most of this residual lignin is solubilized. This solubilized lignin is a strong absorber of visible radiation resulting from the conjugation of unsaturated and quinoidal moieties formed during the oxidation step in the bleach plant. Consequently, the bleach plant effluent is highly colored. Although there are other sources of color in paper mill waste effluent, it is readily apparent that where bleaching is performed its effluent can be expected to be the major contributor of waste color. Indeed, at kraft, bleach mills the effluent from the first caustic extraction stage accounts for at least 70% of the waste color.

The goal of the pulping and bleaching operations is the removal of lignin and hemicellulose from the cellulose fiber in the wood. The 95% that is removed by pulping is often burned as fuel in the process of recovering the inorganic chemicals present in the black liquor. In the bleaching operation, the 5% residual lignin is separated from the fibers by degradation and solubilization and ends up in the wastewater. Chemical removal can, therefore, only be accomplished by reducing this solubility, which has proved to be a difficult task.

The process of color removal from the effluent stream is further complicated by the presence of lime, solid particulate matter like pulp, clay, dispersants/surface active materials and polymers used during various stages in the papermaking process. The solid particulate matter is commonly referred to as anionic trash.

Most governmental regulations pertaining to color removal from the effluent stream of a papermaking process are directed to true color, i.e., defined by the EPA/NCASI test as the absorbance of 465 mm of light by a sample adjusted to a pH of 7.6 and filtered through a 0.8 micrometer filter paper. Color is reported in standard color units (scu) which represents the concentration of a color standard solution producing an equivalent degree of absorbance (1 scu=1 mg/l platinum as chloroplatinate).

Nevertheless, there is increasing pressure on pulp and paper mills to lower the apparent color of the effluent water because that is the color visible to the naked eye as the effluent flows into public waterways. Apparent color is unfiltered and not pH adjusted, and results in part from particles that scatter light. There are occasions when the true color of a system that has undergone treatment is low, but the corresponding apparent color is high. This problem is commonly caused by the presence of suspended particulate matter that causes an increase in the turbidity of the system. Therefore, it is important that any new treatment for color removal should not only remove the true color of the effluent, but should also lower the apparent color as well.

The pressure to remove color comes primarily from state environmental agencies. Previously, it was thought that the discharge of colored waste affected only the aesthetic value of the receiving body of water; however, biologists are becoming increasingly concerned about possible toxic effects, the effect of reduced light transmittance through the water causing reduced levels of photosynthetic activity, and, of course, the resultant drop in dissolved oxygen concentration because of this drop in activity. Furthermore, although these colored, waste products are fairly refractory towards biological oxidation and as such the majority of these colored materials are not removed by biological waste treatment plants.

It has been shown that by-products are water soluble, and that a significant amount is produced. This puts severe demands on chemicals to be used for color removal. There are techniques already available, however, that can remove greater than 90% of the color before, within or after biological waste treatment and from isolated waste streams, such as from the alkaline extraction stage of the bleach plant. These techniques include chemical (e.g., alum, ferric, lime or polyelectrolytes), biological (e.g., white rot fungus) and physical processes (e.g., ultrafiltration, ion exchange and carbon absorption). None enjoys widespread use because of unfavorable economics.

The demands on a product used in a color removal application are quite severe, i.e., the product must be capable of reacting with the color bodies in a manner which results in their becoming insoluble and, because of the extremely large amounts of wastewater produced that contains color bodies, the color removal product must work at very low dosage or its use will be precluded by prohibitive costs.

A common problem associated with conventional chemical treatment methods, such as polymers made from epichlorohydrin-dimethylamine (Epi-DMA), is the fact that those polymers cannot lower the color of a system below a certain value beyond which they tend to re-disperse that color. This problem is commonly referred to as "overdosage".

There is therefore a great demand for a product or process that would greatly refine color, both true and apparent from paper mill wastewaters.

SUMMARY OF THE INVENTION

A process for removing true and apparent color from pulp and paper waste waters which comprises treating these waste waters with a color removing amount of a vinylamine polymer including from about 1 to about 100 mole percent vinylamine and from about 1 to about 99 mole percent of at least one monomer selected from the group consisting of amidine, vinylformamide, vinyl alcohol, vinyl acetate, vinyl pyrrolidinone and the esters, amides, nitriles and salts of acrylic acid and methacrylic acid.

DESCRIPTION OF PREFERRED EMBODIMENTS

The invention comprises a process for removing true and apparent color from pulp and paper waste waters. It comprises treating these waste waters with a color removing amount of a water soluble polymer containing from about 1 to about 100 mole percent vinylamine monomer and/or a monomer hydrolyzable to vinylamine, and/or from 1–99 mole percent of amidine, vinylformamide, vinyl alcohol, vinyl acetate, vinyl pyrrolidinone or the esters, amides, nitrile and salts of acrylic acid and methacrylic acid monomer.

For purposes of this invention, vinylamine monomers include vinylamine and those monomers which are hydrolyzable to the following formula:

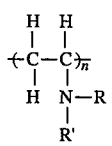

wherein:

R and R' are, preferably, one substituent group selected from the group consisting of hydrogen and an alkyl group having from 1–10 carbon atoms. More preferably, R is hydrogen or is an alkyl group having 1–4 carbons.

The vinylformamide monomer of the invention is non-hydrolyzed and has the following structure:

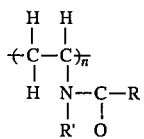

wherein:

R and R' are, preferably, one substituent group selected from the group consisting of hydrogen and an alkyl group having from 1–10 carbon atoms. More preferably, R is hydrogen or is an alkyl group having 1–4 carbons.

The amidine moiety, derived from the amine hydrolysis of polyvinyl formamide has the following structure:

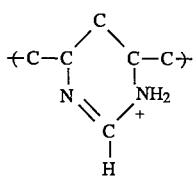

According to one embodiment of the invention, the polymers of the invention include a vinylamine/vinyl alcohol copolymer. Preferably, the copolymer will include from about 1 to about 99 mole % vinylamine and 1 to about 99% vinyl alcohol. More preferably, the copolymer will include from about 2 to about 50 mole % vinyl alcohol and from about 98 to about 50 mole % vinylamine. Most preferably, the vinyl alcohol is included in the copolymer in an amount of from about 10 to about 20 mole % and the vinylamine is included in an amount of from about 90 to about 80 mole %.

According to a further embodiment of the invention, the polymer composition includes vinylamine/vinylformamide copolymer. Preferably, the copolymer includes from about 1 to about 99% vinylamine and from about 1 to about 99% vinylformamide. More preferably, the copolymer includes from about 2 to about 50% vinylamine and from about 98 to about 50% vinylformamide. Most preferably the coagulants include 60–80% vinylamine and 40–20% vinylformamide.

According to a further embodiment of the invention, the polymer composition includes a vinylamine/vinylformamide/amidine terpolymer (A/B/C) in monomer ranges of: A 15–90%; B 5–60%; and C 5–60%. Most preferably the monomer range is about 65/5/30, respectfully.

Processes for making the polymers of the invention are well known in the art. U.S. Pat. Nos. 5,126,395, 5,037,927, 4,952,656, 4,921,621, 4,880,497 and 4,441,602 all describe methods for preparing the polymers of the invention. Solution polymerization produces the desired molecular weight dosage. The resulting vinylformamide homopolymers are susceptible to alkaline or acid hydrolysis which converts some or all of the amide groups to amine groups. These U.S. patents all describe methods for preparing the polymers of the invention. Hydrolysis of the amide groups to yield the amine can be achieved by using acid or base. By controlling the stoichiometry of the hydrolyzing agent it is possible to produce vinylamine/vinylformamide copolymers of varying composition. If vinylformamide is polymerized with other ethylenically unsaturated monomers, then hydrolyzed, it is conceivable that the polymer produced will contain at least three and possibly more functional groups. Cyclic amidine is produced by the amine hydrolysis of polyvinylformamide.

Preferably, the vinylamine polymers of the invention have an average molecular weight of from about 20,000 to 5,000,000. More preferably, the molecular weight is from about 200,000 to about 1,500,000. Vinylamine polymers having molecular weights of from about 500,000 to 800,000 are the most preferred in treatments performed in accordance with this invention.

According to one embodiment of the invention, the pH of the waste waters is within the range of 2 to 12; more preferably, from about 4 to about 9; and most preferably, about 5 to 8. The dosage of the vinylamine polymers will vary depending on the amount of color in the waste water, the pH of the waste water, color bodies and the differences between true and apparent color. Generally, the dosage, based on active polymer, will be from about 1 to about 1,000 ppm by weight of the waste water treated. More preferably, the dosage range is between 20 to about 500 ppm.

The following examples are presented to describe preferred embodiments and utilities of the invention and are not meant to limit the invention unless otherwise stated in the claims appended hereto.

EXAMPLE

EXAMPLE 1

Listed below are several representative polymers containing vinylamine that were evaluated as color removing agents.

| AMINE-CONTAINING POLYMERS | | |
|---|---|---|
| POLYMER | MOLECULAR WEIGHT | COMPOSITION |
| A | 15000–30000 | PVA |
| B | 300000–500000 | PVA |
| C | 900000–2000000 | PVA |
| D | 300000–500000 | 50/50 VA/VF |
| E | 80000–200000 | 6/94 VA/VALCOHOL |
| F | 100000–3000000 | 25/75 VA/VINYLPYRROLIDONE |
| G | 100000–3000000 | 95/5 VA/SODIUM ACRYLATE |
| H | | EPI-DMA |

VA = Vinylamine
VF = Vinylforamidine
PVA = Polyvinylamine
Valcohol = Vinylalcohol
Epi-DMA = Epichlorohydrin-dimethylamine polymer Both apparent and true color reduction/removal were evaluated. Apparent color is measured on the effluent after polymer treatment. True color is measured after polymer treatment by adjusting the pH to 7.6 then filtering through an 8 micron filter. The color values are reported using standard color units (scu).

The above polymers were bench tested on site. The pH of the effluent was adjusted to 7.0±0.5.

| Polymer | Dosage (ppm) | % Reduction in Apparent color | % Reduction in True color |
|---|---|---|---|
| A | 250 | 51.7 | 80.0 |
| B | 250 | 69.0 | 92.6 |
| C | 400 | 66.3 | 91.3 |
| D | 250 | 6.4 | 91.2 |
| E | 200 | 58.9 | 34.8 |

-continued

| Polymer | Dosage (ppm) | % Reduction in Apparent color | % Reduction in True color |
|---|---|---|---|
| F | 200 | 30.4 | 67.6 |
| G | 200 | 42.5 | 67.6 |
| H | 100 | 32.8 | 68.4 |

Changes can be made in the composition, operation and arrangement of the method of the present invention described herein without departing from the concept and scope of the invention as defined in the following claims:

We claim:

1. A process for removing true and apparent color from pulp and paper waste waters which comprises treating these waste waters with a color removing amount of a unquaterized water soluble vinylamine polymer including from about 1 to about 100 mole percent vinylamine and from about 1 to about 99 mole percent of at least one monomer selected from the group consisting of amidine, vinylformamide, vinyl alcohol, vinyl acetate, vinyl pyrrolidinone and the esters, amides, nitriles and salts of acrylic acid and methacrylic acid.

2. The process of claim 1 where the polymer is polyvinylamine.

3. The process of claim 1 where the polymer contains less than 50 mole percent of a monomer selected from the group consisting of N-vinylformamide and vinyl alcohol.

4. The process of claim 1 where the pH of the waste water is between 2–12.

5. The process of claim 2 where the pH of the waste water is between 2–12.

6. The process of claim 1 where the molecular weight of the water soluble polymer is at least 20,000.

7. The process of claim 2 where the molecular weight of the polyvinylamine is at least 20,000.

\* \* \* \* \*